United States Patent [19]

Vukovich et al.

[11] Patent Number: 4,998,604
[45] Date of Patent: Mar. 12, 1991

[54] VARIABLE CAPACITY CONTROL APPARATUS FOR AN AUTOMOTIVE TORQUE CONVERTER CLUTCH

[75] Inventors: William J. Vukovich; Tsunlock A. Yu, both of Ypsilanti, Mich.

[73] Assignee: General Motors Corporation, Detroit, Mich.

[21] Appl. No.: 478,860

[22] Filed: Feb. 12, 1990

[51] Int. Cl.⁵ .................... F16H 45/02; F16H 61/14
[52] U.S. Cl. .................................. 192/3.3; 74/890; 475/65
[58] Field of Search ............... 192/3.29, 3.3, 3.31; 74/890; 475/65

[56] References Cited

U.S. PATENT DOCUMENTS

| | | | |
|---|---|---|---|
| 3,693,478 | 9/1972 | Malloy | 192/3.3 X |
| 3,730,315 | 5/1973 | Annis et al. | 192/3.3 |
| 3,977,502 | 8/1976 | Chana | 192/3.3 |
| 4,468,988 | 9/1984 | Hiramatsu | 74/890 X |
| 4,570,770 | 2/1986 | Nishikawa et al. | 192/3.3 X |
| 4,582,185 | 4/1986 | Grimes et al. | 192/0.076 |
| 4,664,235 | 5/1987 | Yokoyama et al. | 192/3.29 |
| 4,880,090 | 11/1989 | Ando | 192/3.3 |

Primary Examiner—Richard Lorence
Attorney, Agent, or Firm—Mark A. Navarre

[57] ABSTRACT

The torque capacity of a torque converter clutch is controlled with a two-state directional valve and a single solenoid operated pressure control valve. In operation, the directional valve is spring biased to a release state in which converter feed pressure is directed to a passage between the clutch plate and the converter input shell to release the clutch and feed the converter. The return fluid from the opposite (apply side) of the clutch is routed through the directional valve to a low pressure fluid cooler. A control pressure generated by the solenoid operated valve develops a hydraulic bias which opposes the spring bias. When the hydraulic bias is sufficiently great, the directional valve shifts to a control state in which the solenoid operated valve controls the pressure supplied to either the apply or release side of the clutch to control its torque capacity.

3 Claims, 3 Drawing Sheets

VARIABLE CAPACITY CONTROL APPARATUS FOR AN AUTOMOTIVE TORQUE CONVERTER CLUTCH

This invention relates to the control of an automotive torque converter clutch, and more particularly to an apparatus for controlling both enablement and torque capacity of the clutch with a single solenoid operated valve.

BACKGROUND OF THE INVENTION

The torque converter clutch is a fluid-operated friction device engageable to couple the impeller (input) and turbine (output) of a fluidic torque converter. In the usual application, the clutch is either fully released to permit unrestrained slippage between the impeller and turbine, or fully applied to prevent such slippage entirely. In some applications, the clutch may be operated in a slipping mode as well; see, for example, the Grimes U.S. Pat. No. 4,582,185, issued Apr. 15, 1986, and assigned to the assignee of the present invention.

In order to control the clutch slippage or to effect a controlled, progressive engagement of the clutch by known means, apparatus similar to that set forth in the above-referenced U.S. Pat. No. 4,582,185 would generally be required for torque capacity control. That apparatus comprises: a directional valve for directing fluid pressure to the converter for either applying or releasing the clutch, depending on its operating state; a first solenoid operated valve for controlling the operating state of the directional valve for enabling/disabling application of the clutch; and a second solenoid operated valve (such as a PWM valve) for developing the fluid pressure.

SUMMARY OF THE PRESENT INVENTION

The present invention is directed to an improved apparatus for effecting torque capacity control of a torque converter clutch wherein a two-state directional valve and a single solenoid operated pressure control valve cooperate to effect both enablement/disablement and torque capacity control of the clutch.

In operation, the directional valve is spring biased to a release state in which regulated fluid pressure (referred to herein as converter feed pressure) is directed to a passage between the clutch plate and the converter input shell (the release side of the clutch) to release the clutch and feed the converter. The return fluid from the opposite, or apply side, of the clutch is routed through the directional valve to a low pressure fluid cooler.

A control pressure generated by the solenoid operated pressure control valve develops a hydraulic bias which opposes the spring bias. When the hydraulic bias is sufficiently great, the directional valve shifts to an apply state in which the solenoid operated valve controls the pressure supplied to either the apply or release side of the clutch to control its torque capacity. The directional valve directs the converter feed pressure to the apply side of the clutch and the solenoid operated valve controls the pressure to the release side of the clutch to control its torque capacity.

BRIEF DESCRIPTION OF THE DRAWINGS

FIG. 1a depicts the directional valve in the release state, and FIG. 1b depicts the directional valve in the control state.

DETAILED DESCRIPTION OF THE DRAWINGS

Figure 1A:
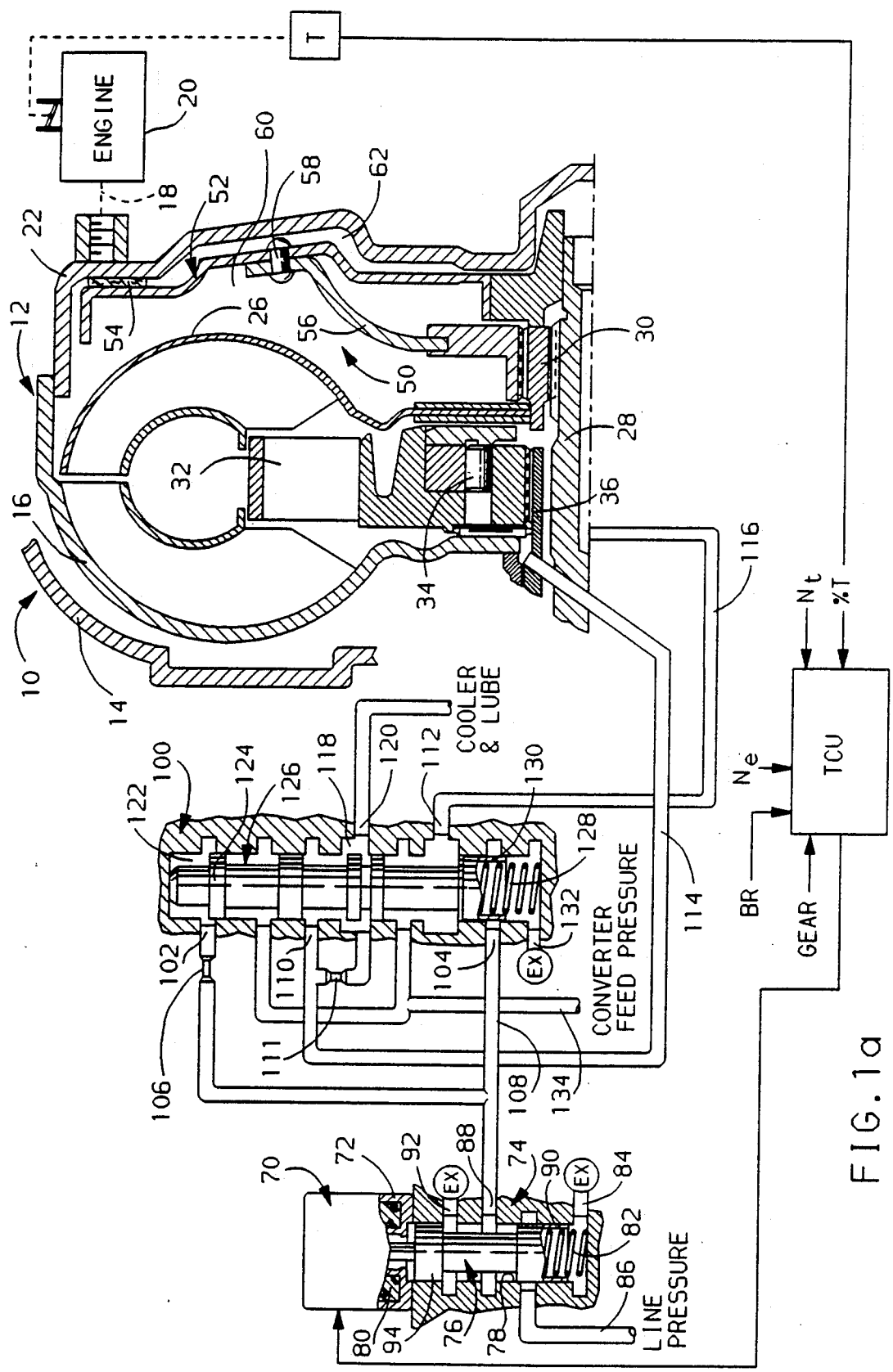
FIGS. 1a–1b depict a conventional torque converter and clutch and control apparatus according to the first embodiment of the present invention.
Figure 1B:
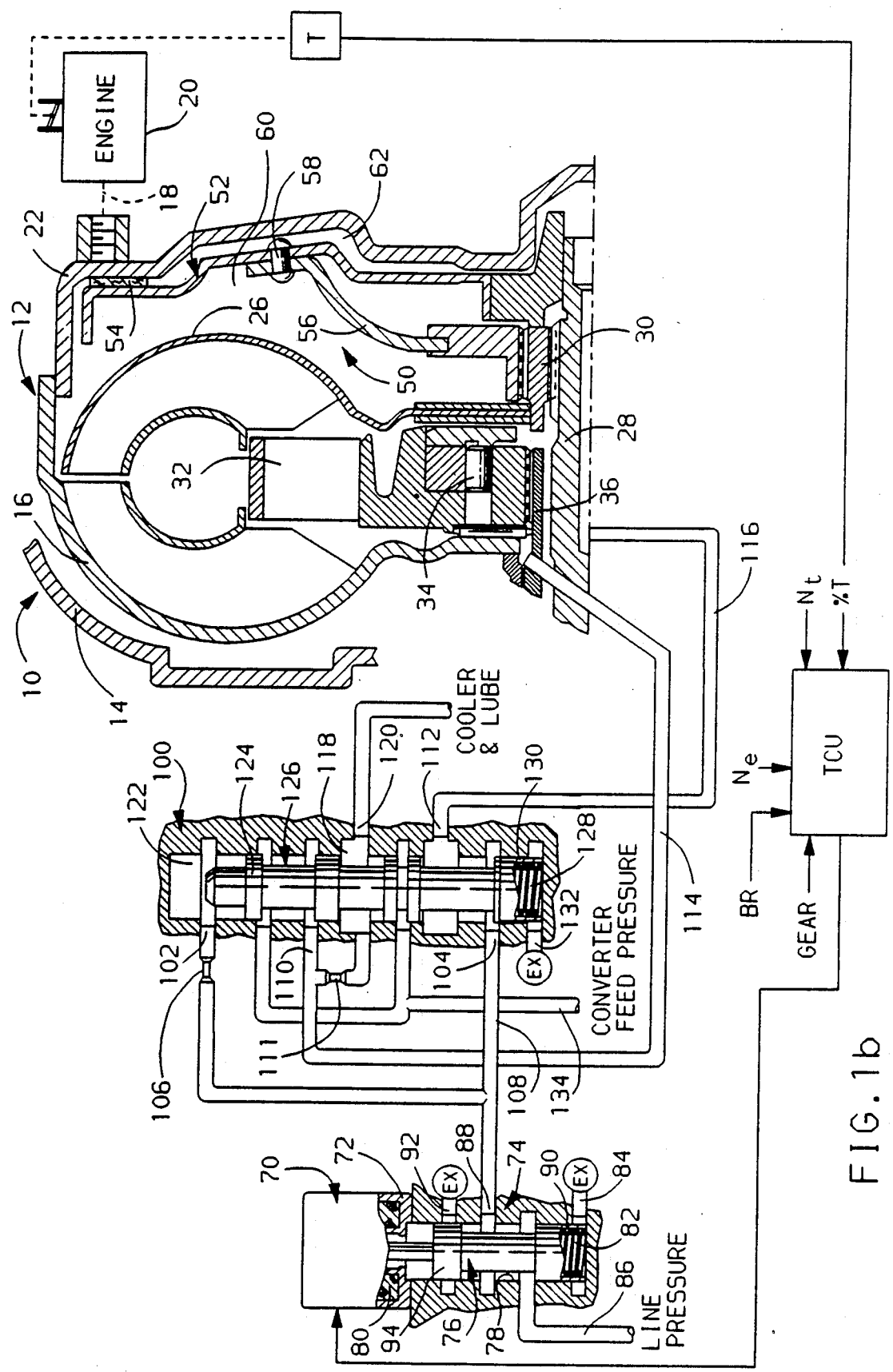

Referring to the drawings, and more particularly to FIGS. 1a–1b, the reference numeral 10 generally designates a portion of an automatic transmission including a conventional fluidic torque converter 12 disposed within the transmission housing 14. The impeller or input member 16 of torque converter 12 is connected to be rotatably driven by the output shaft 18 of engine 20 through the input shell 22. The turbine or output member 26 of the torque converter 12 is rotatably driven by the impeller 16 by means of fluid transfer therebetween, and is connected to rotatably drive the torque converter output shaft 28 through a splined hub member 30. The converter output shaft 28 is coupled via a drive sprocket (not shown) for connection to a gearset defining a plurality of speed ratios between the converter output shaft 28 and the transmission output shaft. A stator 32 redirects the fluid coupling impeller 16 to the turbine 26 and is connected through a one-way device 34 and a splined sleeve shaft 36 to the transmission housing 14.

Also disposed within the transmission housing 14 is a torque converter clutch assembly, generally designated by the reference numeral 50. Clutch 50 includes a clutch plate 52 having a friction surface 54 and a drive member 56 coupled for rotation to clutch plate 52 by rivet connector 58. The drive member 56 and plate 52 are axially slidable on hub member 30, and the drive member 56 is splined onto hub member 30 so that the engagement of friction surface 54 of clutch plate 52 with the input shell 22 provides a mechanical drive between the input shell 22 and the converter output shaft 28.

Clutch plate 52 divides the space between turbine 26 and input shell 22 into two fluid chambers: an apply chamber 60 and a release chamber 62. When the fluid pressure in the apply chamber 60 exceeds that in the release chamber 62, there is a resultant force which tends to move the friction surface 54 into engagement with input shell 22. Such force tends to reduce the slippage between the impeller 16 and turbine 26, and when sufficiently great, fully engages the clutch 50 to prevent such slippage entirely. When the fluid pressure in release chamber 62 exceeds that in apply chamber 60, there is a resultant force which tends to move the friction surface 54 out of engagement with input shell 22. Such force tends to increase the slippage between impeller 16 and turbine 26, and when sufficiently great, fully releases the clutch 50 to permit unrestrained slippage therebetween. The control system of this invention operates as described below to control the fluid pressure in the apply and release chambers 60 and 62 to control the torque capacity of clutch 50.

The solenoid operated valve 70 comprises an integral solenoid 72 and spool valve 74, the spool 76 being linearly displaceable within the valve bore 78 through energization of the solenoid coil 80. A spring 82 biases the spool 76 upward to the position shown in FIG. 1a. When the solenoid coil 80 is energized, the resulting magnetic force overcomes the spring force, displacing the spool to the position shown in FIG. 1b. The area of the valve surrounding spring 82 is exhausted via exhaust port 84.

The inlet port 86 is supplied with the transmission main or line pressure, and the port 88 is a controlled pressure port. When the spool 76 is in the spring biased position of FIG. 1a, the spool sleeve 90 blocks the line pressure at inlet port 86, and the controlled pressure port 88 is exhausted through exhaust port 92. When the spool 76 is in the solenoid biased position of FIG. 1b, the spool land 94 blocks the exhaust port 92, and the controlled pressure port 88 is connected to the line pressure port 86. In operation, the solenoid coil 80 is pulse-width-modulated (PWMed) at a variable duty cycle to shift the spool 76 between the two positions to effect a ratiometric pressure control as explained below.

The directional valve 100 connects the solenoid operated valve 70 to the apply and release chambers 60 and 62 of torque converter clutch mechanism 50. The controlled pressure port 88 is connected to the directional valve ports 102 and 104 via the orifice 106 and the line 108, respectively. The directional valve ports 110 and 112 are connected to the apply and release chambers 60 and 62 via lines 114 and 116, respectively. The port 110 is connected via orifice 111 to the valve chamber 118, which is exhausted to a low pressure fluid cooler or heat exchanger (not shown) via port 120.

The port 102 of directional valve 100 is coupled to a bias chamber 122 so that the pressure at the outlet of orifice 106 acts on land 124 of the directional valve spool 126. A spring 128 disposed within the spool sleeve 130 exerts an upward force in opposition to the downward force of the control pressure in bias chamber 122. The area of the valve surrounding spring 128 is exhausted via exhaust port 132.

When the coil 80 of solenoid operated valve 70 is completely de-energized, the pressure in line 106 is exhausted through port 92 and the directional valve spool 126 assumes the position shown in FIG. 1a. In this configuration, a regulated converter feed pressure in line 134 is supplied to the clutch release chamber 62 via the directional valve port 112 and the line 116, and the apply chamber pressure is diverted to the cooler (not shown). This moves the clutch plate 52 away from the input shell 22, disengaging clutch 50 and supplying operating pressure to the torque converter impeller 16. In this state, normal torque converter operation is achieved.

When it is desired to apply the torque converter clutch 50, the coil 80 of solenoid operated valve 70 is intermittently energized by PWM. This produces a control pressure in line 106, the pressure being dependent on the line pressure supplied to port 86 and the PWM duty cycle. When the PWM duty cycle is relatively low, the resulting pressure in bias chamber 122 of directional valve 100 is insufficient to overcome the bias force of spring 128. Consequently, the directional valve is maintained in the release state of FIG. 1a, and normal torque converter operation continues.

If the PWM duty cycle is increased, the pressure in bias chamber 122 also increases. When the bias pressure force on land 124 exceeds the spring force, the spool 126 moves downward to the control state depicted in FIG. 1b. The pressure and PWM duty cycle which produce the state change of the directional valve 100 are referred to herein as the switch point pressure and switch point duty cycle. Although the spring force is substantially constant for a given displacement, the line pressure, and hence the switch point duty cycle, varies somewhat with the vehicle operation.

In the control state configuration, the regulated converter feed pressure in line 134 is directed via orifice 111 and port 120 to the cooler (not shown) and supplied to the impeller 16 and clutch apply chamber 60 via the directional valve port 110 and the line 114. At the same time, the pressure in the release chamber 62 is connected to the exhaust port 92 via the directional valve ports 112 and 104, the line 108, the solenoid valve port 88, and the valve bore 78. At PWM duty cycles just above the switch point duty cycle, the release chamber pressure is relatively low, resulting in a relatively large net clutch engagement pressure. At relatively high PWM duty cycles, the release chamber pressure is relatively high, resulting in a relatively small net clutch engagement pressure.

Figure 2:
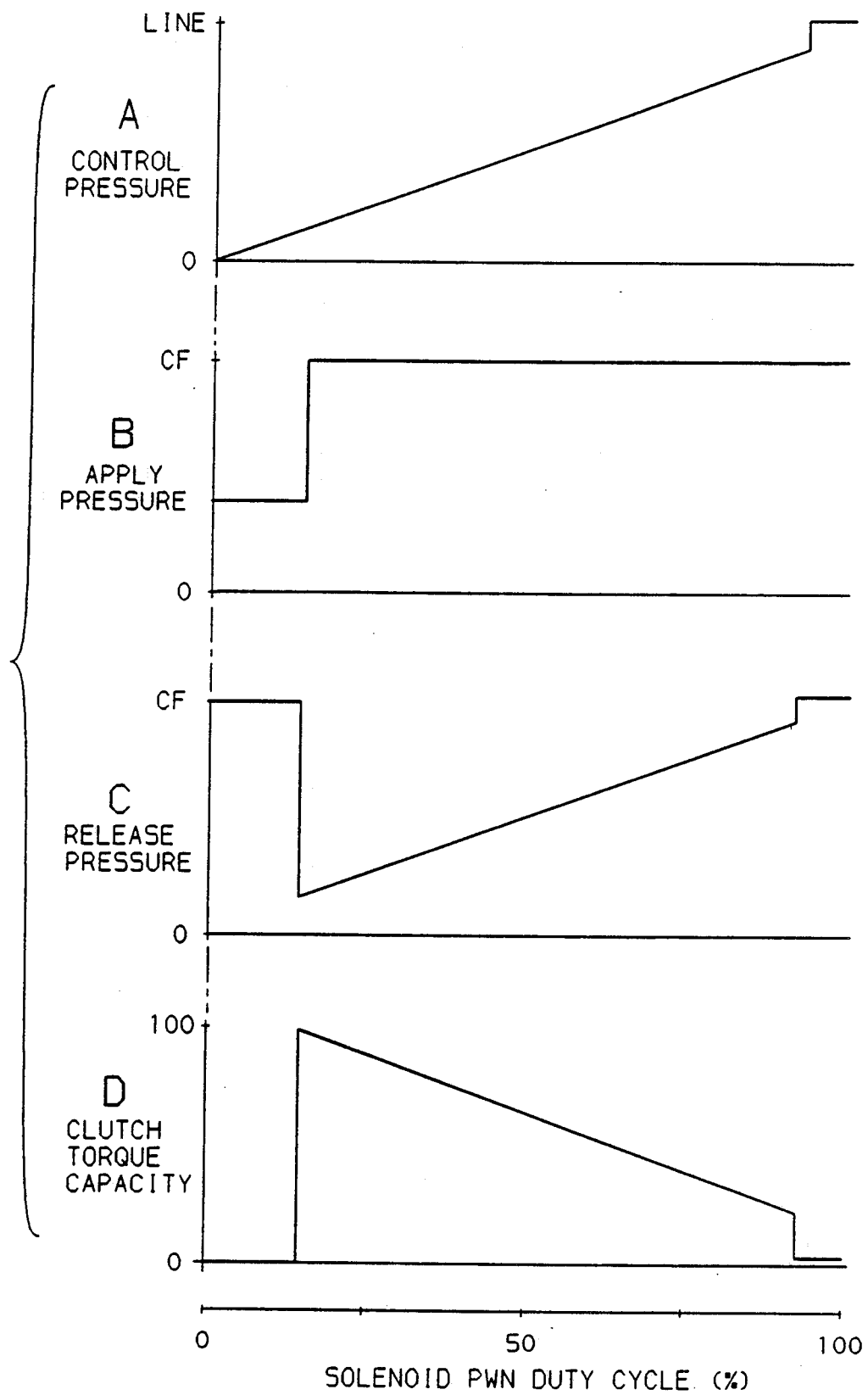
FIG. 2 illustrates the operation of the apparatus depicted in FIGS. 1a–1b, graphically depicting the control pressure, the release-side pressure, the apply pressure and the torque capacity of the clutch, all as a function of the PWM duty cycle applied to the solenoid operated valve.

The pressure relationships described above are graphically depicted in FIG. 2, where Graph A depicts the solenoid valve control pressure in line 108, Graph B depicts the apply chamber pressure, Graph C depicts the release chamber pressure, and Graph D depicts the clutch torque capacity, all as a function of the solenoid coil PWM duty cycle.

When clutch torque capacity control is desired with the apparatus of FIGS 1a-1b, the coil 80 is initially energized at a relatively high PWM duty cycle for (1) shifting the directional valve 100 to the control state, and (2) establishing a relatively high pressure in the clutch release chamber 62. Thereafter, the duty cycle is progressively reduced, thereby increasing the net engagement pressure, and hence the torque capacity, of clutch mechanism 50. The control can be used for progressive engagement of the clutch 50, for a slip control similar to that described in the above-referenced U.S. Pat. No. 4,582,185, or for any other control requiring torque capacity regulation.

The energization of solenoid coil 80 is controlled by an electronic transmission control unit (TCU) 140 via line 142. The control may be made in response to a number of input signals including a brake signal (BR) on line 146, an engine throttle signal (%T) on line 148, a transmission gear signal (GEAR) on line 150, an engine speed signal ($N_e$) on line 152, and a turbine speed signal ($N_t$) on line 154. The engine throttle signal may be obtained with a suitable transducer (T) 156, such as a rotary potentiometer (not shown) responsive to the position of the accelerator pedal or engine throttle for producing an electrical output signal in accordance therewith.

The transmission control unit 140 may be computer based, comprising conventional control elements including a microcomputer, input/output (I/0) circuitry and a high frequency clock. The brake, throttle, gear, engine speed and turbine speed signals on lines 146, 148, 150, 152 and 154 are applied as inputs to the input/output circuitry, and the duty cycle commands developed by the microcomputer are applied to the input/output circuitry for application to the solenoid coil 80.

While this invention has been described in reference to the illustrated embodiments, it is expected that various modifications will occur to those skilled in the art. In this regard, it should be understood that systems incorporating such modifications may fall within the cope of this invention which is defined by the appended claims.

We claim:

1. Control apparatus for a torque converter clutch engageable to develop torque capacity in relation to the net fluid pressure directed to apply and release chambers thereof, comprising:
   means including a control valve for developing a variable magnitude control pressure;
   two-state directional valve means including a spool element displaceable to a first position for disabling engagement of said clutch by directing a regulated fluid pressure to said release chamber while exhausting fluid from said apply chamber, and a second position for enabling engagement of said clutch by directing said regulated fluid pressure to said apply chamber while connecting said release chamber to said control pressure so as to develop clutch torque capacity in relation to the pressure difference; and
   means for biasing said spool element to said second position to enable engagement of said clutch when said control pressure exceeds a reference pressure.

2. Control apparatus for a torque converter clutch engageable to develop torque capacity in relation to the net fluid pressure directed to apply and release chambers thereof, comprising:
   control valve means including an output port, a first spool element displaceable to first and second positions for alternately connecting said output port to relatively high and low pressure ports, respectively, and PWM solenoid means for modulating said first spool element between said first and second positions to develop a ratiometric control pressure at said output port;
   two-state directional valve means including a second spool element displaceable to a disabling state for disabling engagement of said clutch by directing a regulated fluid pressure to said release chamber while exhausting fluid from said apply chamber, and an enabling state for enabling engagement of said clutch by directing said regulated fluid pressure to said apply chamber while connecting said release chamber to said control pressure so as to develop clutch torque capacity in relation to the pressure difference; and
   means for biasing said second spool element to said enabling state to enable engagement of said clutch when said control pressure exceeds a reference pressure.

3. Control apparatus for a torque converter clutch engageable to develop torque capacity in relation to the net fluid pressure directed to apply and release chambers thereof, comprising:
   control valve means including an output port, a first spool element displaceable to first and second positions for alternately connecting said output port to relatively high and low pressure ports, respectively, and PWM solenoid means for modulating said first spool element between said first and second positions to develop a ratiometric control pressure at said output port;
   two-state directional valve means including a second spool element displaceable to a release state for disabling engagement of said clutch by directing a regulated fluid pressure to said release chamber while exhausting fluid from said apply chamber, and a control state for enabling engagement of said clutch by directing said regulated fluid pressure to said apply chamber while connecting said release chamber to said control pressure so as to develop clutch torque capacity in relation to the pressure difference, the second spool element being resiliently biased toward said release state and hydraulically biased toward said control state in relation to the magnitude of said ratiometric control pressure, the directional valve means thereby being operative when said ratiometric control pressure exceeds said resilient bias to (1) displace said spool element to said control state and (2) direct said control pressure to said release chamber for controlling the torque capacity of said clutch.

* * * * *